United States Patent [19]

Serdiuk et al.

[11] Patent Number: 5,276,096
[45] Date of Patent: Jan. 4, 1994

[54] TWO PACKAGE COATING COMPOSITION COMPRISING A POLYCARBODIIMIDE WITH IMPROVED RHEOLOGY CONTROL

[75] Inventors: Paul Serdiuk, Warren, Mich.; Kurt Birdwhistell, New Orleans, La.

[73] Assignee: BASF Corporation, Southfield, Mich.

[21] Appl. No.: 946,002

[22] Filed: Sep. 15, 1992

Related U.S. Application Data

[63] Continuation of Ser. No. 751,042, Aug. 28, 1991, abandoned.

[51] Int. Cl.$^5$ .................... C08F 8/30; C08F 283/04
[52] U.S. Cl. .................... 525/123; 525/329.9; 525/330.5; 525/374; 525/453; 525/907; 525/939; 524/195; 524/558; 524/906; 528/73
[58] Field of Search .................. 525/123, 329.9, 330.5, 525/374, 453, 907, 939; 524/558, 906, 195; 528/73

[56] References Cited

U.S. PATENT DOCUMENTS

| | | | |
|---|---|---|---|
| Re. 31,936 | 7/1985 | Sperry et al. | 524/558 |
| 4,321,394 | 3/1982 | Schafer | 548/234 |
| 4,487,964 | 12/1984 | Watson et al. | 564/252 |
| 4,503,175 | 3/1985 | Houze et al. | 524/558 |
| 4,522,972 | 6/1985 | Mondt et al. | 524/558 |
| 4,587,301 | 5/1986 | Watson et al. | 525/907 |
| 4,966,984 | 10/1990 | Godbey et al. | 525/371 |

FOREIGN PATENT DOCUMENTS 2749691 5/1979 Fed. Rep. of Germany.
3634780 4/1988 Fed. Rep. of Germany.
0137176 10/1980 Japan.

*Primary Examiner*—Paul R. Michl
*Assistant Examiner*—Tae H. Yoon
*Attorney, Agent, or Firm*—Paul L. Marshall; Anne Gerry Sabourin

[57] ABSTRACT

The present invention is directed to a two package coating composition, comprising:
(A) (a1) an acrylic resin having acid and hydroxy groups; and (a2) additives selected from the group consisting of solvents,
   UV-stabilizers, antioxidants, catalysts, flow agents, hindered amine light stabilizers and mixtures thereof; and
(B) (b1) a polycarbodiimide;
   (b2) optionally a crosslinker selected from the group consisting of polyisocyanates, aminoplasts, and mixtures thereof; and
   (b3) additives selected from the group consisting of solvents, flow agents, findered amine light stabilizers, UV-absorbers, and mixtures thereof;

a method of coating an article therewith and the coated article. The coating composition is used as a clearcoat with improved rheology control and no striking in which forms films with excellent appearance and sag resistance.

9 Claims, No Drawings

TWO PACKAGE COATING COMPOSITION COMPRISING A POLYCARBODIIMIDE WITH IMPROVED RHEOLOGY CONTROL

This is a continuation of copending application(s) Ser. No. 07/751,042 filed on Aug. 28, 1991, now abandoned.

FIELD OF THE INVENTION

The present invention is directed to a two package coating composition as a clearcoat for the multi-layer coating of articles, more specifically it is directed to a coating composition comprising a polycarbodiimide.

BACKGROUND OF THE INVENTION

Multi-layer coating systems were developed to satisfy a need for improved aesthetics of the coated substrate, especially automobiles. By applying a relatively thin pigmented layer, termed the "basecoat", and then overcoating with a thicker, unpigmented layer as a topcoat, termed the "clearcoat" it was possible to achieve a glossy coating with good appearance, weatherability, anti-solvent and chemical resistances and anti-discoloring resistances.

In order to obtain the desired appearance of the coating it is necessary to add a rheology control agent like fumed silica, bentone clays or gel particles to the topcoat composition.

These systems are described for example in U.S. Pat. No's. 4,493,914 NAD microgel, 4,377,661 Crosslinked microgel particles, 4,455,331 silica, 4,526,910 silica, 4,558,075 Bentone Clay, and 4,620,994 Bentone Clay.

In addition, in a multi-layer coating system it is necessary that the basecoat have "strike in" resistance. By "strike in" resistance is meant the ability of the basecoat to resist attack by the solvents in the topcoat composition. The strike in is a problem because the automobile manufacturers generally wish to apply the topcoat composition in a color plus clear system by a "wet-on-wet" technique. By this is meant that the basecoat composition is applied to the substrate followed by the topcoat composition and then a single baking step is utilized to cure the composite coating. The topcoat "striking in" to the basecoat is particularly undesirable since it adversely affects alignment of the metallic pigment. In highly pigmented colors the non-metallic pigment particles can provide the physical barrier to prevent strike in. But in silver and light metallic colors there is insufficient pigment to prevent strike in. The rheology control agent or a filler pigment must be used to prevent the strike in.

The U.S. Pat. No. 4,728,543 discloses a clear topcoat composition comprising a film-forming acrylic polymer and internally cross-linked polymer microgel particles to overcome the above-mentioned disadvantages.

The object of the present invention was to provide a coating composition as a clearcoat which does not need the addition of a conventional rheology control agent or the use of microgel particles and which shows improved appearance and sag resistance and which overcomes the striking in.

Another object of the invention was a method of coating an article and the coated article.

SUMMARY OF THE INVENTION

The objects of the present invention are achieved with a two package coating composition comprising:

(A) ($a_1$) an acrylic resin having acid and hydroxy groups; and
   ($a_2$) additives selected from the group consisting of solvents, UV-absorbers, antioxidants, catalysts, flow agents, hindered amine light stabilizers, and mixtures thereof; and
(B) ($b_1$) a polycarbodiimide;
   ($b_2$) a crosslinker selected from the group consisting of polyisocyanates, aminoplasts, and mixtures thereof; and
   ($b_3$) additives selected from the group consisting of solvents, flow agents, hindered amine light stabilizers, UV-absorbers and mixtures thereof.

DETAILED DESCRIPTION OF THE INVENTION

Component (A) of the coating composition of the present invention comprises an acrylic resin ($a_1$) having acid and hydroxy groups and additives ($a_2$).

Suitable acrylic resins ($a_1$) are obtainable by polymerizing:

i) about 1 to about 30% by weight of an ethylenically unsaturated carboxylic acid;
ii) about 10 to about 50% by weight of an ethylenically unsaturated monomer having a hydroxy group; and
iii) about 20 to about 90% by weight of other ethylenically unsaturated monomers. (*100%)

Preferred acrylic resins ($a_1$) are obtainable by polymerizing:

i) about 1 to about 10% by weight of an ethylenically unsaturated carboxylic acid;
ii) about 15 to about 40% by weight of an ethylenically unsaturated monomer having a hydroxy group; and
iii) about 50 to about 85% by weight of other ethylenically unsaturated monomers.

Most preferred acrylic resins ($a_1$) are obtainable by polymerizing:

i) about 1 to about 5% by weight of an ethylenically unsaturated carboxylic acid;
ii) about 20 to about 35% by weight of an ethylenically unsaturated monomer having a hydroxy group; and
iii) about 60 to about 80% by weight of other ethylenically unsaturated monomers.

Suitable ethylenically unsaturated carboxylic acids (i) are acrylic acid, methacrylic acid, acryloxy propionic acid or polyacrylic acid mixtures, methacrylic acid dimer or polymethacrylic acid mixtures, crotonic acid, fumaric acid, maleic acid, itaconic acid, and monoalkyl esters of maleic, itaconic or fumaric acids.

Preferred are acrylic acid and methacrylic acid.

Suitable ethylenically unsaturated monomers having a hydroxy group (ii) are hydroxyethyl acrylate, hydroxyethyl methacrylate, hydroxypropyl acrylate, hydroxypropyl methacrylate, hydroxybutyl acrylate, hydroxybutyl methacrylate, propylene glycol monoacrylate, 2,3-dihydroxypropyl methacrylate, pentaerythritol monomethacrylate, polypropylene glycol monoacrylates, and monomethacrylates, polyethylene glycol monoacrylates and polyethylene glycol monomethacrylates.

Other examples are maleic acid and fumaric acid dihydroxyalkyl esters in which the straight chained, branched or cyclic alkyl group contains 2 to 20 carbon atoms.

N-hydroxyalkyl (meth)acrylamides and N-hydroxyalkyl fumaric acid mono- or diamides may also be used, e.g., N-hydroxyethyl acrylamide or N-(2-hydroxypropyl) methacrylamide. Other hydroxyl group-containing compounds include allyl alcohol, monovinylethers of polyols, especially diols, such as monovinyl ethers of ethylene glycol and butanediol, and hydroxyl group-containing allyl ethers or esters such as 2,3-dihydroxypropyl monoallyl ether, trimethylolpropane monoallyl ether or 2,3-dihydroxypropanoic acid allyl ester.

Preferred are hydroxy ethyl (meth)acrylate, hydroxy propyl (meth)acrylate, and hydroxy butyl (meth)acrylate.

The other ethylenically unsaturated monomers (iii) may be chosen from acrylic or methacrylic alkyl ester derived from alcohols having 1 to about 20 carbon atoms, or vinyl monomers. The expression (meth)acrylate with parenthesis as used herein includes methacrylate and acrylate. Suitable examples are methyl (meth)acrylate, ethyl (meth)acrylate, propyl (meth)acrylate, n-butyl (meth)acrylate, isobutyl (meth)acrylate, tert.-butyl (meth)acrylate and 2-ethylhexyl (meth)acrylate, maleic acid or fumaric acid dialkyl esters in which the alkyl groups have 1 to 20 carbon atoms, vinyl aromatics such as styrene, alpha-methyl styrene, vinyl toluene, tert.-butyl styrene, halogenated vinyl benzenes such as chlorostyrene, and other monomers like vinyl chloride, (meth)acrylamide and (meth)acrylonitrile.

Copolymerization is carried out using conventional techniques such as heating the monomers in the presence of a polymerization initiating agent and optionally chain transfer agents. The copolymerization may be carried out in bulk or solution. Suitable solvents for solution polymerization are ethylene glycol or propylene glycol and their derivatives, such as dipropylene glycol monomethyl ether and ethylene glycol monobutyl ether acetate; alcohols, such as butyl alcohol and diacetone alcohol; ketones, such as methyl propyl ketone and acetone; esters, such as butyl acetate and pentyl propionate; ethers, such as dioxane and tetrahydrofuran; and other compatible solvents, such as N-methyl pyrrolidone; aromatic solvents such as toluene, xylene, and aromatic solvent blends sold under trade names such as Aromatic 100 from Exxon.

Typical initiators are peroxides such as dialkyl peroxides, peroxyesters, peroxydicarbonates, diacyl peroxides, hydroperoxides, and peroxyketals and azo compounds such as 2,2'-azobis(2-methylbutanenitrile) and 1,1'-azobis (cyclohexanecarbonitrile).

Typical chain transfer agents are mercaptans such as octyl mercaptan, n- or tert.-dodecyl mercaptan; halogenated compounds; thiosalicylic acid, mercaptoacetic acid, mercaptoethanol, buten-1-ol, and dimeric alpha-methyl styrene. Mercaptans are preferred.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be between ten seconds and thirty minutes.

The solvent or solvent mixture is generally heated to the reaction temperature and the monomers and initiator(s) are added at a controlled rate over a period of time, usually between 2 and 6 hours. A chain transfer agent or additional solvent may be fed in also at a controlled rate during this time. The temperature of the mixture is then maintained for a period of time to complete the reaction. Optionally, additional initiator may be added to ensure complete conversion.

The acid number of the acrylic resin ($a_1$) is from about 1 to about 230 mg KOH/g, preferably from about 10 to about 50 mg KOH/g, most preferably from about 20 to 35 mg KOH/g.

OH number of $a_1$ is 70 to 200, preferably 80 to 180, most preferably 85 to 170 mg KOH/g.

The acrylic resin has a weight average molecular weight determined by GPC versus polystyrene standards of from about 3,000 to about 40,000, preferably from about 5,000 to about 25,000. The theoretical Tg of the acrylic resin is from about $-30°$ C. to about 150° C., preferably from about $-10°$ C. to about 50° C. The theoretical Tg may be determined as described by Fox in Bull. Amer. Physics Soc., Vol. 1, No. 2, Page 123 (1956).

Suitable additives ($a_2$) comprise pigments, organic solvents, catalysts, wetting agents, surfactants, conditioning agents, adhesion promotors, thickeners, rheology control agents, UV-light absorbers, antioxidants, plasticizers, fungicides, flow agents, hindered amine light stabilizers, UV-absorbers, and mixtures thereof.

Although the coating composition of the present invention is designed for clearcoats and show excellent rheology control, pigment and rheology control agents could be optionally used.

Suitable solvents are aromatic solvents such as xylene, propylene and ethylene glycol derivatives such as propylene glycol monomethyl ether acetate, ethylene glycol monobutyl ether acetate, esters such as butyl acetate, and pentyl proprionate. They are used in an amount, that the solid content in component (A) is from about 40 to about 60% by weight based on the total weight of component (A). The other additives could be used in effective amounts.

Component (B) of the coating composition of the present invention comprises a polycarbodiimide ($b_1$), a crosslinker ($b_2$) and additives ($b_3$).

The polycarbodiimide ($b_1$) has carbodiimide units of from about 5 to about 30 and a molecular weight of 1,000 to 100,000. Additionally can contain polyether groups to make it emulsifiable. The polycarbodiimide is commercially available as a 50 to 75% organic solution for example as XL20 from Union Carbide.

The polycarbodiimide ($b_1$) is used in an amount of from about 1 to about 20% by weight, preferably from about 2 to about 15% based on the total amount of components (A) and (B). The molar ratio of the polycarbodiimide ($b_1$) to the acid on the acrylic resin ($a_1$) is from about 1.5 to 0.67:1.

The coating composition of the present invention is suitable as a clearcoat without a crosslinker. However, a crosslinker could be optionally used as component ($b_2$).

Suitable crosslinkers comprise acrylic, polyester, alkyd, epoxy or an aminoplast resins, polyisocyanates or mixtures thereof.

Preferred are polyisocyanates, which are well known in the art and comprise aliphatic, cycloaliphatic and/or aromatic isocyanates containing at least 2 isocyanate groups per molecule.

Examples of aliphatic diisocyanates useful in the present invention are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate.

Examples of cycloaliphatic diisocyanates useful in the present invention include isophorone diisocyanate, cyclopentylene diisocyanate and the hydrogenation products of aromatic diisocyanates such as cyclohexylene diisocyanate, methylcyclohexylene diisocyanate and dicyclohexylmethane diisocyanate.

Suitable aromatic diisocyanate include phenylene diisocyanate, tolylene diisocyanate, xylylene diisocyanate, biphenylene diisocyanate, naphthylene diisocyanate and 4,4' diphenylmethane diisocyanate or isomers of isomeric mixtures thereof.

Examples of triisocyanates useful in the present invention are the biuret of hexamethylene diisocyanate and water, the isocyanurate of hexamethylene diisocyanate and the product of addition of isophorone diisocyanate to trimethylolpropane.

Preferred polyisocyanates are isocyanurate or biuret trimers of hexamethylene diisocyanate, timethylolpropane isophorone diisocyanate adduct, or mixtures thereof.

When a crosslinker is used, a preferable amount is from about 5 to about 45% by weight based on the total amount of components (A) and (B).

The additives ($b_3$) could be basically the same as additives ($a_2$) but preferably ($b_3$) is limited to organic solvents in order to keep the polycarbodiimide ($b_1$) and the crosslinker ($b_2$) in solution without reaction with the crosslinker. Suitable solvents are aromatic solvents such as xylene, esters such as butyl acetate, or any solvents that do not contain an active hydrogen.

An amount of organic solvents is used that component (B) has a solid content of from about 70 to about 90% by weight.

In order to form a multi-layer coating, components (A) and (B) are mixed together and applied wet on wet on a conventional basecoat by conventional methods like spraying, brushing, dipping, flow coating and the like; spraying is preferred. The basecoat could be a solventborne high solid metallic basecoat or waterborne metallic basecoat.

After being deposited, the multi-layer coating is baked, in order to crosslink the acrylic resin.

A preferred baking step involved heating the coated substrate for a period of 10-60 minutes at a temperature of between 60° and 140° C. The baking step cures the coating to a hard, durable film.

The final coating shows an excellent appearance, no strike in, and a good sag resistance.

EXAMPLES

EXAMPLE 1A

An acrylic resin was prepared from 5 parts n-butyl acrylate, 35 parts butyl methacrylate, 32 parts styrene, 25 parts hydroxypropyl acrylate, and 3 parts acrylic acid using conventional free radical solution polymerization and shows the following properties: Mn=2365, Mw=5041, Tg=30° C., OH-No.=108 and Acid-No.=23.

The acrylic resin was then formulated to 70% NV (non volatile) as follows:

| Item | Material Description description | Source |
|---|---|---|
| Resimene 755 | Mixed ether melamine methylated and butylated (crosslinker) | Monsanto |
| Polybutyl Acrylate | A620Ae (flow agent) | Cook Paint and Varnish |
| Tinuvin 328 | Hindered amine light stabilizers | Ciba Geigy |
| Nacure XP-158 | Amine Blocked ParaToluene Sulfonic Acid (Catalyst) | King Ind. |
| XL-20 | Carbodiimide (50% solution in PM-Acetate) | Union Carbide |
| XL-25 | Carbodiimide (50% solution in PM-Acetate) | Union Carbide |
| Biosoft-100 | Unblocked Dodecybenzene Sulfonic Acid (Catalyst) | King Ind. |
| Fumed Silica | Aerosil R-972 | Degussa |
| Nacure 5225 | Amine Blocked Dodecylbenzene Sulfonic Acid (Catalyst) | King Ind. |
| Sanduvar 3206 | Oxanilide UV Absorber | Sandos Color & Chemical |
| Silicon Additive | 10% solution of BYK 300 in Xylene | BYK Chemie |
| Isocyanate | DES N 3300; Hexamethylene diisocyanate trimer | Mobay |
| Tinuvin 440L solution | 30% solution of Hindered Amine Light Stabilizer in Xylene | Ciba Geigy |
| Cymel 303 | Hexamethoxy methyl melamine (crosslinker | American Cyanamid |

| COMPONENT | PARTS |
|---|---|
| Acrylic Resin 1A | 60.44 |
| Resimene 755 | 18.00 |
| Polybutyl acrylate | 0.50 |
| Tinuvin 328 (30% solution in xylene) | 8.00 |
| Nacure XP-158 | 2.40 |
| Solvent (xylene) | 10.66 |

EXAMPLE 1B

| | PARTS |
|---|---|
| COMPONENT A | |
| Acrylic resin 1A | 60.44 |
| Resimene 755 | 18.00 |
| Polybutyl acrylate | 0.50 |
| Tinuvin 328 solution | 8.00 |
| Nacure XP-158 | 2.40 |
| COMPONENT B | |
| Polycarbodiimide (xylene) | 11.61 |

EXAMPLE 2A

An acrylic resin was prepared in a 50:50 solvent blend of xylene/solvesso 100 from 5 parts methyl methacrylate, 17 parts butyl acrylate, 27 parts butyl methacrylate, 23 parts styrene, 25 parts hydroxypropyl acrylate, and three parts acrylic acid with the following properties: Mn=2239, Mw=5540, Tg=16° C., OH-No.=108 and Acid-No.=23.

The acrylic resin was then formulated as a 2 component non-isocyanate clearcoat to 70% NV as follows:

| | PARTS |
|---|---|
| COMPONENT A | |
| Acrylic resin 2A | 57.84 |
| Polybutyl acrylate | 0.50 |
| Biosoft S-100 | 0.60 |
| Solvent (xylene) | 7.00 |

-continued

| | PARTS |
|---|---|
| COMPONENT B | |
| Resimene 755 | 18.00 |
| Tinuvin 328 solution | 8.00 |
| Solvent (xylene) | 8.06 |

EXAMPLE 2B

| | PARTS |
|---|---|
| COMPONENT A | |
| Acrylic resin 2A | 57.84 |
| Polybutyl acrylate | 0.50 |
| Biosoft S-100 | 0.60 |
| Solvent (xylene) | 3.46 |
| COMPONENT B | |
| Resimene 755 | 18.00 |
| Tinuvin 328 solution | 8.00 |
| Polycarbodiimide | 11.60 |

EXAMPLE 3A

An acrylic resin was prepared in an 80:20 solvent blend of primary amyl acetate/solvesso 100 from 25 parts butyl acrylate, 28 parts t-butyl acrylate, 25 parts styrene, 20 parts hydroxyethyl acrylate, and 2 parts acrylic acid with the following properties: Mn=2684, Mw=8015, Tg=17° C., OH-No.=97 and Acid-No.=16.

The acrylic resin was then formulated to 70% NV as a typical clearcoat as follows:

| COMPONENTS | PARTS |
|---|---|
| Acrylic resin 3A | 57.76 |
| Resimene 755 | 18.00 |
| Polybutyl acrylate | 0.50 |
| Tinuvin 328 solution | 8.00 |
| Nacure 5225 | 2.40 |
| Solvent (xylene) | 13.34 |

EXAMPLE 3B

| | PARTS |
|---|---|
| COMPONENT A | |
| Acrylic resin 3A | 57.76 |
| Resimene 755 | 18.00 |
| Polybutyl acrylate | 0.50 |
| Tinuvin 328 solution | 8.00 |
| Nacure 5225 | 2.40 |
| Solvent (xylene) | 5.60 |
| COMPONENT B | |
| Polycarbodiimide | 7.74 |

EXAMPLE 3C

| | PARTS |
|---|---|
| FUMED SILICA DISPERSION | |
| Acrylic resin 3A | 40.0 |
| Fumed Silica | 9.0 |
| Solvent (xylene) | 51.0 |
| COMPONENTS | |
| Acrylic resin 3A | 54.65 |
| Resimene 755 | 18.00 |
| Polybutyl acrylate | 0.50 |
| Tinuvin 328 solution | 8.00 |
| Nacure 5225 | 2.40 |
| Solvent | 5.34 |
| Fumed Silica Dispersion | 11.11 |
| FUMED SILICA DISPERSION | |
| Acrylic resin 3A | 40.00 |
| Fumed Silica | 9.00 |
| Solvent | 51.00 |

EXAMPLE 3D

| | PARTS |
|---|---|
| COMPONENT A | |
| Acrylic resin 3A | 53.36 |
| Resimene 755 | 17.58 |
| Polybutyl acrylate | 0.50 |
| Tinuvin 328 solution | 7.81 |
| Fumed Silica Dispersion | 10.85 |
| Nacure 5225 | 2.34 |
| COMPONENT B | |
| Polycarbodiimide | 7.56 |

EXAMPLE 4A

An acrylic resin was prepared in an 80:20 solvent blend of xylene/solvesso 100 from 14.5 parts n-butyl acrylate, 36 parts t-butyl acrylate, 17.5 parts styrene, 28 parts hydroxyethyl acrylate, and 4 parts acrylic acid with the following properties: Mn=2228, Mw=5700, Tg=24° C., OH-No.=135 and Acid-No.=31.

The acrylic resin was then formulated to 70% nv as a typical clearcoat as follows:

| COMPONENTS | PARTS |
|---|---|
| Acrylic resin 4A | 57.57 |
| Resimene 755 | 18.00 |
| Polybutyl acrylate | 0.50 |
| Tinuvin 328 solution | 8.00 |
| Nacure 5225 | 2.40 |
| Solvent solution | 13.53 |

EXAMPLE 4B

| | PARTS |
|---|---|
| COMPONENT A: | |
| Acrylic resin 4A | 57.37 |
| Resimene 755 | 17.94 |
| Polybutyl acrylate | 0.50 |
| Tinuvin 328 solution | 7.97 |
| Nacure 5225 | 2.39 |
| COMPONENT B | |
| Polycarbodiimide (XL-20) | 13.83 |

EXAMPLE 4C

| | PARTS |
|---|---|
| COMPONENT A | |
| Acrylic resin 4A | 50.09 |
| Resimene 755 | 16.55 |
| Polybutyl acrylate | 0.50 |
| Fumed Silica Dispersion | 10.22 |
| Tinuvin 328 solution | 7.35 |
| Nacure 5225 | 2.21 |
| COMPONENT B | |

| | PARTS |
|---|---|
| Polycarbodiimide (XL-25) | 13.08 |

EXAMPLE 5A

An acrylic resin was prepared in xylene from 5 parts methyl methacrylate, 20 parts n-butyl acrylate, 26 parts t-butyl and acrylate, 15 parts styrene, 30 parts hydroxypropyl acrylate, and 4 parts acrylic acid with the following properties: Mn=2216, Mw=5174, Tg=18° C., OH-No.=129 and Acid-No.=31.

The acrylic resin was then formulated to 70% NV as a typical clearcoat as follows:

| COMPONENTS | PARTS |
|---|---|
| Acrylic resin 5A | 57.42 |
| Resimene 755 | 18.00 |
| Polybutyl acrylate | 0.50 |
| Tinuvin 328 | 8.00 |
| Nacure 5225 | 2.40 |
| Solvent (xylene) | 13.68 |

EXAMPLE 5B

| | PARTS |
|---|---|
| COMPONENT A | |
| Acrylic resin 5A | 56.41 |
| Resimene 755 | 17.68 |
| Polybutyl acrylate | 0.50 |
| Tinuvin 328 solution | 7.85 |
| Nacure 5225 | 2.36 |
| COMPONENT B | |
| Polycarbodiimide | 15.20 |

EXAMPLE 5C

| | PARTS |
|---|---|
| COMPONENT A | |
| Acrylic resin 5A | 57.42 |
| Resimene 755 | 18.00 |
| Polybutyl acrylate | 0.50 |
| Tinuvin 328 solution | 8.00 |
| Nacure 5225 | 2.40 |
| Solvent (xylene) | 6.77 |
| COMPONENT B | |
| Polycarbodiimide | 6.91 |

EXAMPLE 6A

An acrylic resin was prepared in a 75:25 solvent blend of xylene/methyl amyl ketone from 10 parts styrene, 31 parts n-butyl acrylate, 19 parts butyl methacrylate, 38 parts hydroxypropyl methacrylate and 2 parts acrylic acid with the following properties: Mn=3709, Mw=8941, Tg=5° C., OH-No.=148, and The resin was then formulated to 70% NV as a typical 2K isocyanate clearcoat as follows:

| | PARTS |
|---|---|
| COMPONENT A | |
| Acrylic resin 6A | 56.63 |
| Butylcellosolve Acetate | 3.04 |
| Sandovar 3206 | 2.27 |
| Tinuvin 440L | 2.02 |
| Silicon additive | 2.81 |
| COMPONENT B | |
| Isocyanate | 21.91 |
| Solvent (xylene) | 11.32 |

EXAMPLE 6B

An acrylic resin was prepared in a solvent blend of 75:25 xylene/methyl amyl ketone from 10 parts styrene, 28 parts n-butyl acrylate, 19 parts butyl methacrylate, 38 parts hydroxypropyl methacrylate and 5 parts acrylic acid with the following properties: Mn=2618, Mw=5714, Tg=8.6° C., OH-No.=148 and Acid-No.=

The resin was then formulated to 70% NV as a typical 2K isocyanate clearcoat as follows:

| | PARTS |
|---|---|
| COMPONENT A | |
| Acrylic resin 6A | 44.51 |
| Butylcellosolve Acetate | 2.67 |
| Sandovur 3206 | 2.00 |
| Tinuvin 440L | 1.77 |
| Silicon additive | 2.46 |
| COMPONENT B | |
| Polycarbodiimide | 4.79 |
| Isocyanate | 19.20 |
| Solvent (xylene) | 22.62 |

EXAMPLE 6C

An acrylic resin was prepared in a solvent blend of 75:25 xylene/methyl amyl ketone from 10 parts styrene, 31 parts n-butyl acrylate, 19 parts butyl methacrylate, 38 parts hydroxypropyl methacrylate and 2 parts acrylic acid with the following properties: Mn=2297, Mw=3463, Tg=−11° C., OH-No.=148 and Acid-No.=17.

The resin was then formulated to 70% NV as a typical 2K isocyanate clearcoat as follows:

| | PARTS |
|---|---|
| COMPONENT A | |
| Acrylic resin 6C | 46.66 |
| Butylcellosolve Acetate | 2.91 |
| Sandovur 3206 | 2.18 |
| Tinuvin 440L | 1.93 |
| Silicon additive | 2.69 |
| COMPONENT B | |
| Polycarbodiimide | 5.23 |
| Isocyanate | 20.97 |
| Solvent (xylene) | 17.43 |

EXAMPLE 6D Control

The control for example 6 was a commercial melamine cured clearcoat containing 1.7% fumed silica for rheology control (BASF Corporation).

TESTING PROCEDURE

The clearcoats which were described in examples 1A through 5C were formulated and sprayed wet on wet over a high solids metallic basecoat, whereas examples 6A through 6C and the melamine cured control for this series were formulated and sprayed wet on wet over a straight shade black basecoat using a standard sag panel substrate. The clearcoats were sprayed in a wedge, flashed for 5 minutes on their sides and then baked at 120° C. for 17 minutes.

The point of sag is defined as the film build at which the length of the sag is 1 cm. This film build is defined as the initial point of sag. The sag is also measured at higher film build to determine the extent to which the rheology control agent helps to reduce sag. The length of the sag then is measured at 1 mil of clearcoat higher than the onset of sag, that is, if the clearcoat begins to sag at 1.4 mils, then the length of the sag at 2.4 mils of clearcoat is measured. In this way, the degree of sag can be determined regardless of the total film build of the clearcoat.

RAW MATERIALS

The basecoats used in these studies are commercially available and were obtained ready to use solvent borne high solids metallic basecoat and waterborne metallic basecoats. Monomers and solvents were obtained in bulk from a commercial source and used as is, without additional purification. The clearcoat formulations were designed to mimic current commercial systems. The polycarbodiimide XL-20 was obtained from Union Carbide as 50% NV in PM-Acetate, and was used as received.

TABLE 1

Results of Sag Studies

| EXAMPLE | FILM BUILD AT ONSET SAG (MIL) | mm sag at film thickness 1 mil above onset of sag |
|---|---|---|
| 1A | 2.1 | 4 3 |
| 1B | 3.3 | 1 3 |
| 2A | 1.9 | 2 5 |
| 2B | 2.4 | 1 5 |
| 3A | 1.4 | 3 2 |
| 3B | 1.9 | 2 7 |
| 3C | 1.6 | 4 2 |
| 3D | 2.2 | 2 1 |
| 4A | 1.5 | 3 1 |
| 4B | 2.9 | 2 2 |
| 4C | 2.5 | 2 3 |
| 5A | 1.4 | 3 2 |
| 5B | 9.3 | * * |
| 5C | 1.7 | 1 5 |

**UNABLE TO BE MEASURED

EXAMPLE 7

A major advantage of the coating composition of the present invention is that in some clearcoat formulations, specifically those containing polar solvents, the amount of strike-in or redissolving of the basecoat by the clearcoat is noticeably reduced. This is most evident in metallic basecoats when sag occurs since the penetration of the clearcoat into the basecoat during sag disturbs the orientation of the metal. Therefore, reduction of the strike-in phenomenon results in the production of both horizontal and vertical panels with noticeably improved appearance.

An acrylic resin based on 20 parts n-butyl acrylate, 33 parts butyl methacrylate, 10 parts styrene, 35 parts hydroxyethyl acrylate, and 2 parts acrylic acid and having a Tg of −4° C. was utilized for redissolve (strike-in) studies. This acrylic was formulated as a conventional clearcoat (heretofor referred to as Base) with and without polycarbodiimide and sprayed wet on wet over a light blue metallic basecoat. This was compared to a commercially available clearcoat with fumed silica as a reology control agent.

| Base component | Parts |
|---|---|
| Acrylic 7 | 49.6 |
| Cymel 303 | 26.8 |
| Sanduvar 3206 | 2.2 |
| Tin 440L solution | 2.6 |
| Butanol | 5.5 |
| polybutyl acrylate | 0.5 |
| Nacure 5225 | 2.4 |

7A: Acrylic 7
7E: 95.8 parts of 7A and 4.2 parts Carbodiimide

| Example | 7B | 7C | 7D |
|---|---|---|---|
| Parts Base | 89.5 | 89.5 | 89.5 |
| Parts Carbodiimide | — | 2.9 | 4.4 |
| Parts Xylene | 10.4 | 7.5 | 6.0 |

| TEST/EXAMPLE | 7A | 7B | 7C | 7D | 7E |
|---|---|---|---|---|---|
| FILM AT SAG MILS | 1.3 | 1.1 | 1.4 | 1.5 | 1.4 |
| sag length at film build of 1.4 mils | 12 | 16 | 6 | 7 | 5 |
| sag length at film build of 1.8 mils | >19 | >19 | 15 | 12 | 9 |
| HORIZONTAL | 4 | 2 | 3 | 4 | 5 |
| VERTICAL | 4 | 2 | 3 | 4 | 5 |
| STRIKE IN | 4 | 2 | 3 | 4 | 5 |

5 GOOD
1 POOR

We claim:
1. A two package coating composition, comprising:
   (A) (a1) an acrylic resin having acid and hydroxy groups;
   (a2) organic solvent; and
   (a3) additives selected from the group consisting of UV-stabilizers, antioxidants, catalysts, flow agents, hindered amine light stabilizers and mixtures thereof; and
   (B) (b1) a polycarbodiimide;
   (b2) a crosslinker selected from the group consisting of polyisocyanates, aminoplasts, and mixtures thereof;
   (b3) organic solvent; and
   (b4) additives selected from the group consisting of flow agents, hindered amine light stabilizers, UV-absorbers and mixtures thereof.

2. The composition according to claim 1, wherein said acrylic resin (a1) is obtainable by polymerizing:
   i) about 1 to about 30% by weight of an ethyleniclaly unsaturated carboxylic acid;
   ii) about 10 to about 50% by weight of an ethylenically unsaturated monomer having a hydroxy group; and
   iii) about 89 to about 20% by weight of other ethylenically unsaturated monomers.

3. The composition according to claim 2, wherein said ethylenically unsaturated carboxylic acid (i) is selected from the group consisting of acrylic acid, methacrylic acid, acryloxy propionic acid, polyacrylic acid mixtures, methacrylic acid dimer, polymethacrylic acid mixtures, crotonic acid, fumaric acid, maleic acid, itaconic acid, and mixtures thereof.

4. The composition according to claim 2, wherein the ethylenically unsaturated monomer having a hydroxy group (ii) is selected from the group consisting of hydroxyethyl acrylate, hydroxyethyl methacrylate, hydroxypropyl acrylate, hydroxypropyl methacrylate, hydroxybutyl acrylate, hydroxybutyl methacrylate, and mixtures thereof.

5. The composition according to claim 2, wherein the other ethylenically unsaturated monomers (iii) are selected from the group consisting of methyl (meth)acrylate, ethyl (meth)acrylate, propyl (meth)acrylate, n-butyl (meth)acrylate, isobutyl (meth)acrylate, tert.-butyl (meth)acrylate and 2-ethylhexyl (meth)acrylate, maleic acid or fumaric acid dialkyl esters in which the alkyl groups have 1 to 20 carbon atoms, vinyl aromatics such as styrene, alpha-methyl styrene, vinyl toluene, tert.-butyl styrene, halogenated vinyl benzenes such as chlorostyrene, and other monomers like vinyl chloride, (meth)acrylamide and (meth)acrylonitrile.

6. The composition according to claim 1, wherein said polycarbodiimide has a functionality of from about 5 to about 30 and a molecular weight of 1,000 to 100,000.

7. The composition according to claim 1, wherein said polycarbodiimide is used in an amount of from about 2 to about 15% by weight based on the total amount of components (A) and (B).

8. The composition according to claim 1, wherein said crosslinker ($b_2$) is a polyisocyanate.

9. The composition according to claim 1, wherein the ratio of components (A) to (B) is from about 0.1 to 10:1.

* * * * *